US010245530B2

(12) United States Patent
Hallot

(10) Patent No.: US 10,245,530 B2
(45) Date of Patent: Apr. 2, 2019

(54) MODULAR PLANT AND PROCESS FOR LIQUID/GAS SEPARATION, IN PARTICULAR FOR LIQUID AND GASEOUS PHASES OF A CRUDE OIL

(71) Applicant: SAIPEM S.A., Montigny le Bretonneux (FR)

(72) Inventor: Raymond Hallot, Voisins le Bretonneux (FR)

(73) Assignee: Saipem S.A., Montigny le Bretonneux (FR)

( * ) Notice: Subject to any disclaimer, the term of this patent is extended or adjusted under 35 U.S.C. 154(b) by 208 days.

(21) Appl. No.: 15/115,219

(22) PCT Filed: Jan. 28, 2015

(86) PCT No.: PCT/FR2015/050189
§ 371 (c)(1),
(2) Date: Jul. 28, 2016

(87) PCT Pub. No.: WO2015/114247
PCT Pub. Date: Aug. 6, 2015

(65) Prior Publication Data
US 2016/0339359 A1   Nov. 24, 2016

(30) Foreign Application Priority Data
Jan. 29, 2014 (FR) .................................. 14 00216

(51) Int. Cl.
*B01D 19/00* (2006.01)
*E21B 43/36* (2006.01)
*E21B 43/40* (2006.01)

(52) U.S. Cl.
CPC ...... *B01D 19/0057* (2013.01); *B01D 19/0036* (2013.01); *B01D 19/0042* (2013.01); *E21B 43/36* (2013.01); *E21B 43/40* (2013.01)

(58) Field of Classification Search
CPC ................ B01D 19/00; B01D 19/0036; B01D 19/0042; B01D 19/0057; E21B 43/34–43/40
(Continued)

(56) References Cited

U.S. PATENT DOCUMENTS 6,019,825 A   2/2000 Greene et al.
7,210,530 B2   5/2007 Lush et al.
(Continued)

FOREIGN PATENT DOCUMENTS

EP   2 425 883   3/2012
FR   2 528 106   12/1983
(Continued)

*Primary Examiner* — T. Bennett McKenzie
(74) *Attorney, Agent, or Firm* — Cozen O'Connor

(57) ABSTRACT

A modular installation for liquid/gas separation of a multiphase fluid such as crude oil. The installation has a plurality of unitary separation devices, each constituted by an enclosure co-operating at its base with a coaxial connection piece connected to a support structure resting on the sea bottom or suitable for being connected thereto. The support structure being suitable for receiving a plurality of the unitary separation devices in reversible manner so as to be able to perform disconnections at will, in particular for increasing the separation capacity of the installation and/or for performing maintenance on the unitary separation device at the surface.

15 Claims, 5 Drawing Sheets

(58) Field of Classification Search
USPC .............................. 95/241–266; 166/265–267
See application file for complete search history.

(56) References Cited

U.S. PATENT DOCUMENTS

2005/0081718 A1    4/2005  Carruth
2015/0090124 A1*   4/2015  Alqahtani .............. B65G 17/00
                                                          95/253

FOREIGN PATENT DOCUMENTS

FR         2 915 403        10/2008
FR         2 921 844         4/2009

* cited by examiner

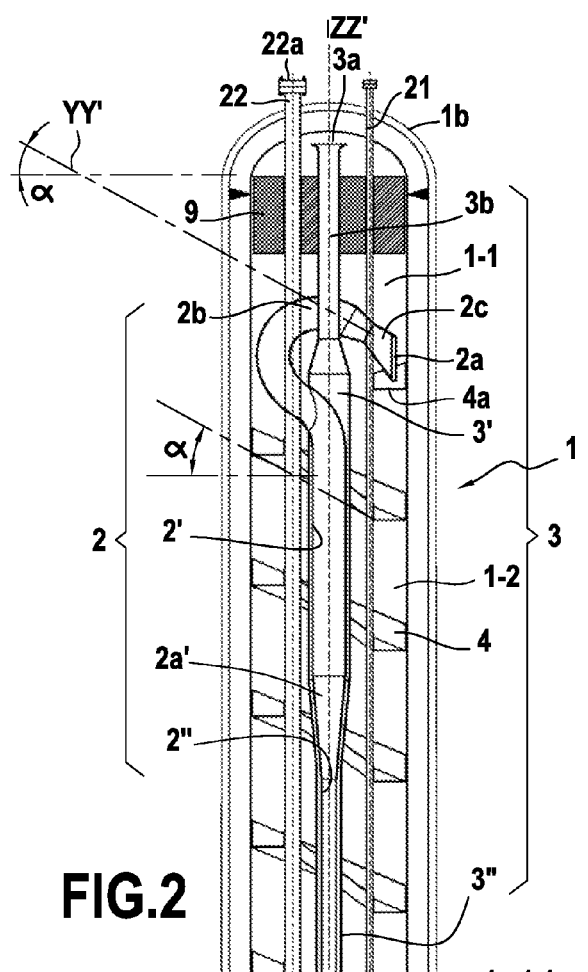
FIG.2
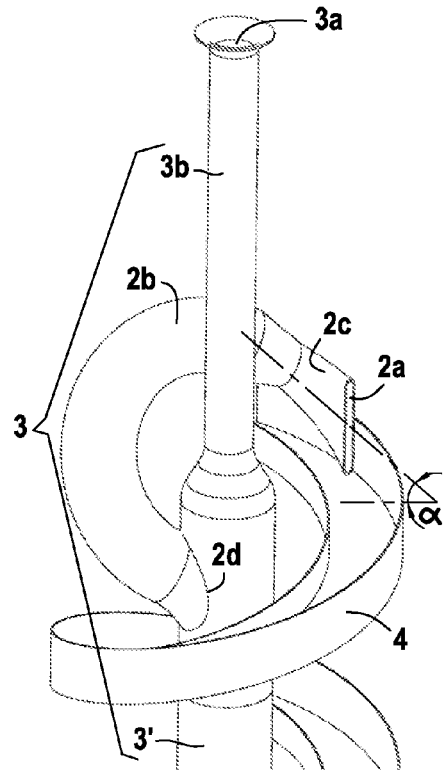
FIG.2A
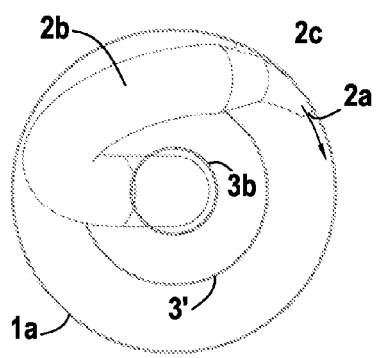
FIG.2B
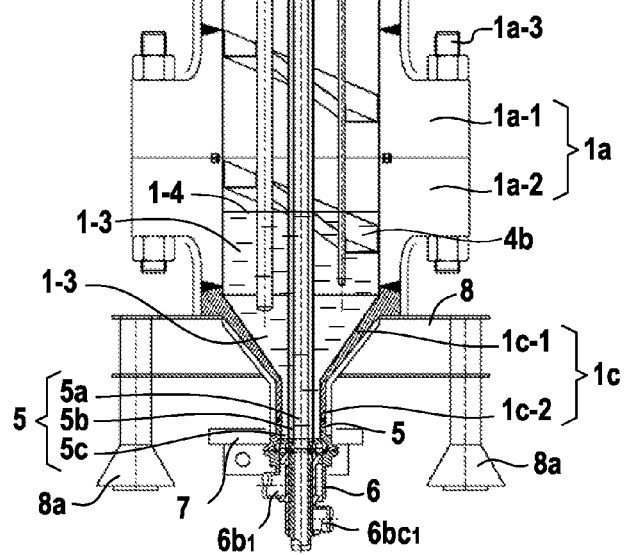

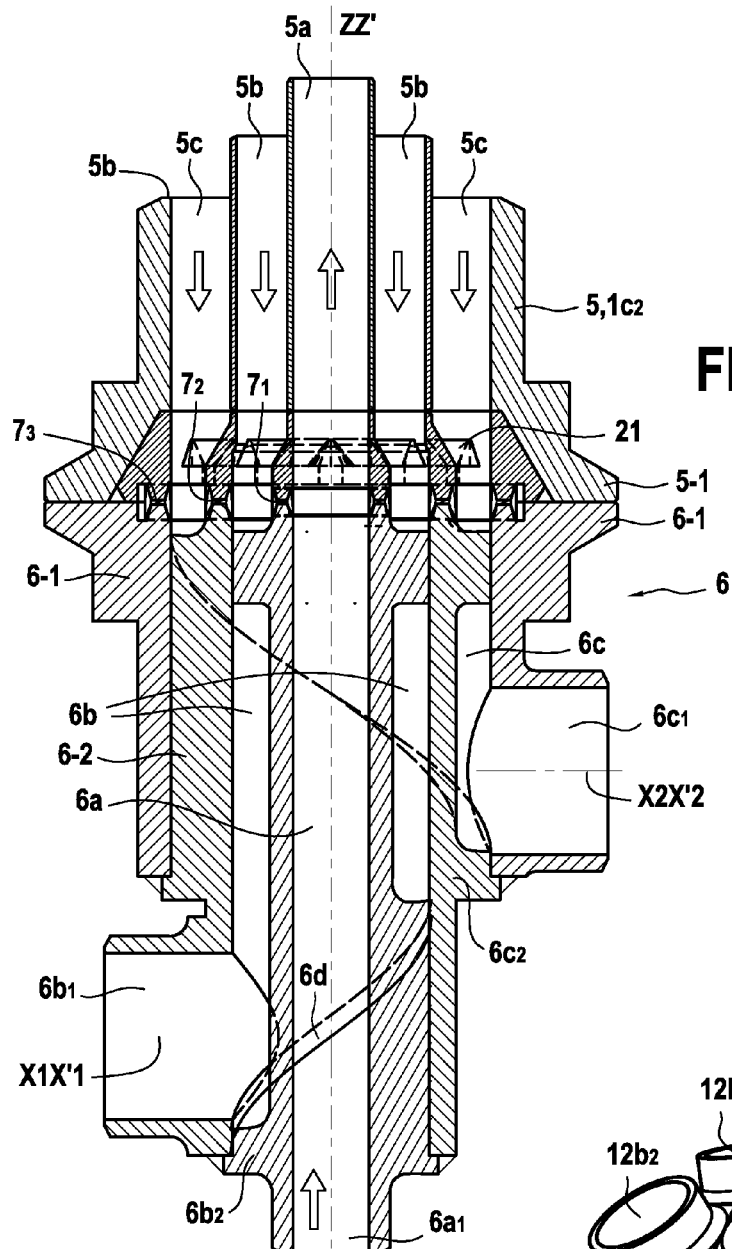
FIG.3
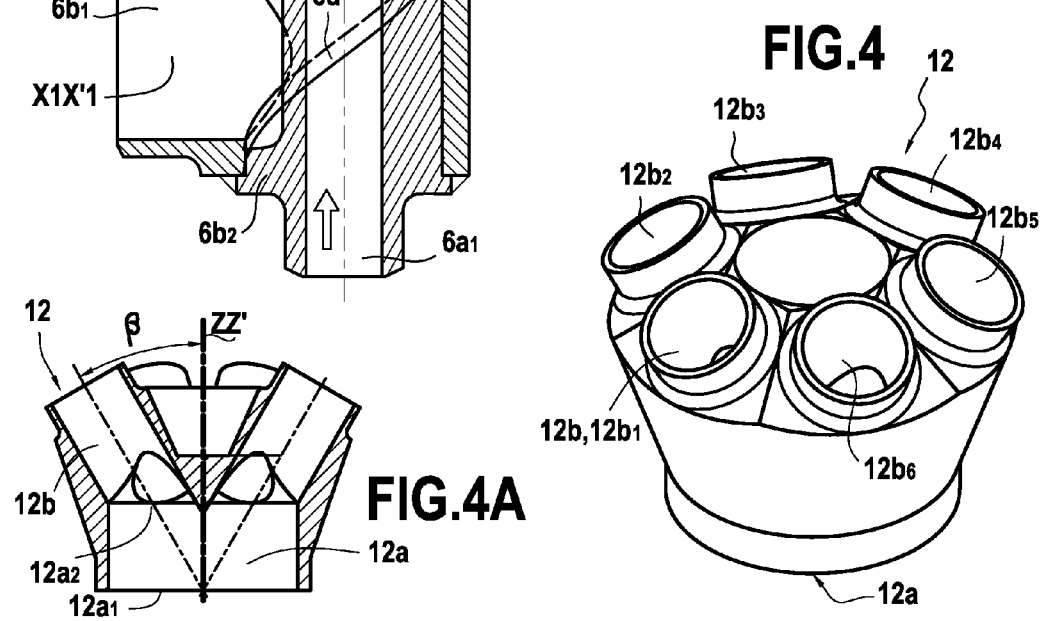
FIG.4
FIG.4A

MODULAR PLANT AND PROCESS FOR LIQUID/GAS SEPARATION, IN PARTICULAR FOR LIQUID AND GASEOUS PHASES OF A CRUDE OIL

PRIORITY CLAIM

This is a U.S. national stage of application No. PCT/FR2015/050189, filed on Jan. 28, 2015. Priority is claimed on France Application No.: FR1400216, filed Jan. 29, 2014, the content of which is incorporated here by reference.

BACKGROUND OF THE INVENTION

The present invention relates to a modular installation for liquid/gas separation that is of the vertical type, and also to a method of separating a multiphase fluid, in particular oil-water and gas contained in crude oil.

More particularly, the technical field of the invention is the field of oil production, and more particularly from oilfields at sea in great depths.

Deep sea oil production is generally performed from a floating support anchored in the proximity of oil wells that are situated at the sea bottom, i.e. at depths lying in the range 1000 meters (m) to 2500 m, or even more. In general, the floating support has anchor means enabling it to remain in position in spite of the effects of currents, winds, and swell. It also generally includes means for storing and processing oil together with off-loading means for off-loading oil to tankers that call at regular intervals in order to remove the production. The common term for such supports is floating production storage and off-loading supports, and they are referred to throughout the description below by the initials FPSO.

The wellheads are generally connected to said FPSO by undersea pipes, either of the suspended catenary riser (SCR) type, or of the hybrid tower type, comprising:
- a vertical riser having its bottom end anchored to the sea bottom and connected to a said pipe resting on the sea bottom, and its top end tensioned by a float immersed in the subsurface to which it is connected; and
- a connection pipe, generally a flexible connection pipe, between the top end of said riser and a floating support on the surface, said flexible connection pipe taking on, where appropriate, a dipping catenary curve shape as a result of its own weight, i.e. dipping down well below the float before subsequently rising up to said floating support.

The entire production of crude oil is thus generally raised on board the FPSO in order to be processed so as to separate the oil proper from the water, the gas, and the sandy components, if any. The oil, once separated, is thus stored on board, the gas is washed and then sent to gas turbines for producing the electricity and the heat needed on board, and then any surplus is injected into the reservoir of the oil field so as to restore pressure in said reservoir. The water, after being released from sand in suspension, is finally either rejected into the sea after thorough extraction of oil particles, or else it is likewise reinjected into the reservoir, with additional seawater taken from the subsurface generally also being added in order to achieve the necessary flow rate for injecting water into the reservoir. The extracted sand, which represents only minimal quantities, is finally washed and then rejected into the sea.

A known method of separating gas, water, and oil from crude oil that is commonly employed on stationary installations on land and on board the FPSOs consists in using enclosures that withstand pressure, that are of very large volume, generally in the form of elongate cylinders, with the crude oil entering via one end and travelling along said enclosure for a duration of about three minutes (min) to about 10 min, during which the various phases separate naturally under gravity before reaching the second end. Gas is then recovered from the top portion of said enclosure, water and sand from the bottom portion, and oil from an intermediate portion. There exists a very large variety of separators of that type, that generally include additional internal devices, such as horizontal, vertical, or sloping screens for the purposes of facilitating separation of the phases and of preventing them from re-mixing at a later stage.

Those separators operate at low pressure, e.g. in the range 3 bars to 10 bars, and sometimes even at negative pressures, in order to optimize degassing the crude oil. If it is desired to install that type of separator at the sea bottom, said enclosure must be capable of withstanding crushing as a result of the pressure that is equal substantially to 100 bars, i.e. substantially 10 megapascals (MPa), for each 1000 m of water depth, and also the internal pressure, which depends on the pressure of the oil reservoir and which can reach 1400 bars in certain circumstances. As a result, transposing such an enclosure to enable it to be used at great or very great depth would require wall thicknesses in the range 100 millimeters (mm) to 300 mm in order to withstand implosion, and such sheet metal elements would be very difficult and very expensive to make and install on the sea bottom at great depth.

Document FR 2 915 403 in the name of the Applicant discloses an undersea gas-liquid separator device, however that device comprises an enclosure containing a set of enclosures arranged vertically that are permanently connected to one another and that are of large weights and volumes, that assembly being found, in certain circumstances, difficult to put into place on the sea bottom and requiring installation ships having considerable offshore hoisting capacity, and in particular requiring the use of installation ships that are longer than 200 m. Also, elements internal to the enclosure, such as sensors, run the risk of failing and/or becoming clogged, and they possibly also run the risk of plugging liquid discharge outlets. Such incidents require maintenance that cannot be performed by disconnecting and recovering the enclosures individually using conventional maintenance vessels (known as "inspection, maintenance, and repair (IMR) vessels"), which are generally of relatively small size and hoisting capacity.

In another field, in document FR 2 961 712 in the name of the Applicant, proposals are made for a modular undersea installation for liquid-liquid separation that is constituted by a plurality of pipes that slope a little relative to the horizontal, that are in parallel, and that are individually connectable and disconnectable at will, and that can therefore be installed at the bottom and thus handled while limiting the weight of the elements that are to be handled from the surface.

SUMMARY OF THE INVENTION

An object of the present invention is to provide an improved gas/liquid separator device suitable for being installed and for operating on the sea bottom in great depth, in particular at least 1000 m, that is simpler and less expensive to make, install, and use on the sea bottom, and more particularly an installation that can be installed and recovered by a ship of small size and hoisting capacity, and that can be maintained while using a ship of size and hoisting capacity that are conventional for maintenance and assistance of an offshore installation.

To do this, the present invention provides a modular undersea installation for liquid/gas separation of respective liquid and gaseous phases of a fluid, in particular the liquid and gaseous phases of a crude oil, the installation comprising:

a) a main support structure resting on and/or anchored to the sea bottom and having a plurality of unitary devices for liquid/gas separation connected thereto or suitable for being connected thereto in reversible manner; and b) at least one unitary device for liquid/gas separation fastened on said main support structure, each said unitary device for liquid/gas separation comprising a single enclosure comprising a leaktight wall that withstands pressure at the sea bottom and the internal pressure of said fluid, the wall being arranged about a vertical axis of revolution, and said enclosure containing:
  b1) a first internal pipe for delivering the multiphase fluid, the first internal pipe rising within said enclosure from its bottom end that includes or co-operates with a first orifice passing through a wall portion of the enclosure referred to as the end wall, up to its open top end opening out into the top portion of the enclosure; and
  b2) a second internal pipe for discharging gas, the second internal pipe extending within said enclosure from its open top end, preferably located higher than said top opening of the first pipe, to its bottom end that includes or co-operates with a second orifice passing through the end wall of the enclosure; and
  b3) a third orifice passing through said end wall of the enclosure around said first and second orifices in the end wall of the enclosure; and c) a plurality of three-channel connection pieces fastened to said support structure, with at least one said connection piece being connected to a said enclosure, each said connection piece comprising:
  c1) a first connection duct having a top end connected to a said first orifice of the end wall of said enclosure, or suitable for being connected thereto, said first connection duct having a first outlet orifice connected to an external pipe for supplying said multiphase fluid at the sea bottom or to a pipe element connected to the end of an external pipe for supplying said multiphase fluid at the sea bottom, or suitable for being connected thereto; and
  c2) a second connection duct having a top end connected to a said second orifice of the end wall of said enclosure, or suitable for being connected thereto, said second connection duct having a second outlet orifice connected to an external pipe for discharging gas, or suitable for being connected thereto; and
  c3) a third connection duct arranged around said first and second connection ducts at its top end connected to a said third orifice of the end wall of said enclosure, or suitable for being connected thereto, said third connection duct having a third outlet orifice connected to an external pipe for discharging liquid, or suitable for being connected thereto.

Preferably, said second orifice of the end wall of the enclosure is an annular second orifice arranged coaxially around said tubular first orifice of the end wall of the enclosure, and said third orifice of the end wall of the enclosure is an annular third orifice arranged coaxially around said first and second orifices of the end wall of the enclosure, and said three-channel connection piece is a connection piece having three coaxial channels and arranged vertically on said support structure and comprising:
  c1) a first connection duct arranged vertically and from which said first outlet orifice is constituted by the axial bottom end of said first connection duct; and
  c2) a second connection duct, arranged coaxially around said first duct at its top end, and connected vertically to an annular said second orifice of said end wall of the enclosure, or suitable for being connected vertically thereto, and including a said second outlet orifice constituting a lateral orifice; and
  c3) a third connection duct arranged coaxially around said first and second connection ducts at its top end, and connected vertically to an annular said third orifice of the end wall of the enclosure, or suitable for being connected vertically thereto, and including a said third outlet orifice constituting a lateral orifice.

More particularly, said first and second lateral outlet orifices are oriented in two diametrically opposite directions on either side of the connection piece and in a direction that is substantially perpendicular to said vertical axial direction.

The term "in reversible manner" is used of a connection to mean that after the unitary separation devices have been connected to the support structure, they can be disconnected therefrom in order to be raised to the surface and/or subjected to maintenance before being reconnected.

Advantageously, said support structure supports valves co-operating respectively with the external fluid supply pipes, the external gas discharge pipe, and the external liquid discharge pipe in order to enable said external pipes to be closed prior to connecting and disconnecting a said unitary separation device.

It also can be understood that said first connection duct is open at its bottom end in axial continuity with its top opening connected to said central first orifice of the enclosure, or suitable for being connected thereto, in contrast to said second and third connection ducts of the pre-channel connection piece, which are closed at their axially bottom ends.

The facility of using a plurality of said unitary devices makes it possible to use enclosures of size and weight that are relatively small, and in particular less than 100 metric tonnes (t) and preferably less than 50 t, so as to enable them to be lowered from the surface down to a said support structure at the sea bottom, in particular in great depths of more than 1000 m, or even more than 3000 m, while using maintenance vessels of lifting capacities that are usual for offshore inspection maintenance and repair vessels. Thus, it is possible to increase or to reduce the number of unitary devices for processing a required quantity of fluid to be separated or for performing maintenance on the surface, at will and depending on requirements.

The coaxial arrangement of the invention of said first, second, and third orifices passing through the end wall of the enclosure, and of said first, second, and third ducts respectively of said connection piece is particularly advantageous for several reasons.

Firstly, this coaxial arrangement makes it possible, once the connection piece has been connected with said first, second, and third orifices under the end wall of said enclosure, for a first internal sealing gasket between said first duct of the connection piece and the bottom end of said tubular first orifice of the fluid delivery internal pipe to be subjected to pressures that are substantially equal, being exposed on one side to the pressure P1 inside said first internal pipe for delivering fluid, and on the other side to substantially the same pressure P1 in said second internal pipe for discharging gas. Likewise, a second internal sealing gasket between said second duct of the connection piece and the bottom end of said annular second orifice of the internal pipe for discharging gas is exposed on one side substantially to the pressure P1 in said second internal pipe and likewise to substantially the same pressure P1 on its other side inside said enclosure and outside said second internal pipe for discharging gas.

The equal pressures across the two internal gaskets is particularly advantageous since the fluid flow rate of a leak in the event of said gaskets failing is relatively negligible. Furthermore, the risk of seawater leaking into the gas pipe is extremely low, since a simultaneous failure of all three concentric gaskets would be necessary for that event to occur, which event would be critical for the gas line.

The coaxial arrangement of the connection piece with said first, second, and third orifices under the end wall of said enclosure is also advantageous for making it easier to connect the enclosure with said connection piece, since it enables the enclosure to turn through a relative angle about the vertical axis of the enclosure and of said connection piece while lowering and docking the enclosure on the connection piece, where such angular variations occur frequently under such circumstances and are difficult to prevent. Thus, docking is simpler to guide and does not require any accurate angular indexing in order to be achieved.

Said second internal pipe and said second connection duct could be arranged coaxially respectively inside said first internal pipe and said first connection duct, at the level of said first and second orifices of the enclosure. Nevertheless, said second internal pipe and said second connection duct are preferably arranged coaxially around said first internal pipe and said first connection duct respectively, at said first and second orifices of the enclosure. Specifically, the axial central arrangement of the opening at the bottom end of said first central duct of said first connection piece is advantageous since it also makes it possible for said external pipe for supplying said multiphase fluid at the sea bottom or said pipe element connected to the end of an external pipe for supplying said multiphase fluid at the sea bottom to present a radius of curvature that is large enough (without making a T-bend) at its junction with the connection piece relative to the axial direction ZZ' of fluid flow within said connection piece and then said axial first internal pipe to avoid disturbing this flow and thus to avoid shearing the fluid so as to avoid fractioning bubbles of gas and/or droplets of liquid, which would make subsequent gas/liquid separation more difficult, prior to performing phase separation within the enclosure at the top outlet from the first pipe.

Preferably, said support structure resting on the sea bottom supports at least one device for dividing and distributing the multiphase fluid and presenting a single main tubular axial supply orifice that is preferably arranged vertically, having its open bottom end connected to the end of an external pipe for supplying said fluid at the bottom of the sea, or suitable for being connected thereto, and having its open axial top end communicating with a plurality of tubular outlet orifices that are inclined relative to said axial direction, that are of the same diameter, and that are inclined at the same angle (β) and that are arranged symmetrically and regularly relative to and around said axial direction, said secondary tubular outlet orifices being connected to a plurality of pipe elements for transferring supply fluid, or being suitable for being connected thereto, which pipe elements are connected respectively to a plurality of said first ducts of said connection pieces, or are suitable for being connected thereto, which connection pieces are connected to the bottom ends of a plurality of said enclosures, or are suitable for being connected thereto.

Preferably, said connection pieces and said enclosures are arranged relative to said division device, preferably above and around said division device, in such a manner that head losses between said division device and said enclosures are substantially identical to one another.

Also preferably, said connection pieces and said enclosures are arranged symmetrically relative to said division device above and around said division device.

It can be understood that said tubular second outlet orifices present a diameter smaller than the diameter of said main tubular orifice for axial supply. Thus, the supply stream of multiphase fluid is divided into a plurality of same-flow rate streams, the flow rate of each divided stream thus becoming less than the main flow rate arriving by the main external supply pipe.

This fluid stream division device is advantageous since it enables the fluid to be delivered in parts that are sent into the various unitary separation devices, which parts are made equal and more uniform in terms of composition and in terms of the head losses to which the fluid is subjected within said transfer pipe elements.

More particularly, said enclosure is secured to first guide elements of male or preferably female type, arranged at the outside of said enclosure, and said support structure includes second guide elements of female or of male type, respectively, co-operating with said first complementary guide elements, or suitable for co-operating therewith, to enable a said unitary device to dock vertically facing a said connection piece.

It can be understood that these first and second guide elements enable said top ends of said first, second, and third ducts of the connection piece to be connected coaxially more easily respectively with said first, second, and third orifices passing through the end wall of the enclosure lowered from the surface.

More particularly, said enclosure has a cylindrical side wall of circular section, having its top end closed by a domed and preferably spherical cap and having an end wall at its bottom end that is in the form of a funnel that tapers downwards to form a vertical tubular bottom wall defining said annular third orifice for discharging liquid. The final shape facilitates discharging solid sediments, in particular sand.

More particularly, said first internal pipe for delivering multiphase fluid extends vertically, preferably substantially on the axis of said enclosure, inside said second internal pipe beneath a top portion of said first internal pipe, which top portion of said first internal pipe loops back outside said second internal pipe, in particular forms a loop with multiple curves in the form of a swan neck, terminating in a fluid outlet nozzle preferably having a flared wall defining a said top opening of said first internal pipe, more preferably having a section of flat shape, such that said top opening of the first pipe opens out in the proximity of the side wall of the enclosure so that the fluid flows out therefrom parallel to said cylindrical side wall in a direction that slopes downwards, and said second internal pipe for discharging gas extends axially coaxially relative to said first internal pipe beneath said top portion thereof.

The flat shape of the section of said opening of said nozzle causes the fluid to flow in laminar manner, pressed against the wall of the enclosure. Furthermore, the enlarging flared shape of the wall of said nozzle slows down the flow speed of the fluid at the outlet from the fluid delivery pipe. And because of the centrifugal force to which the multiphase fluid is subjected, this slowing down of the fluid and its flow tangential to the side wall of the enclosure at the outlet from said nozzle prevents the fluid striking against the wall and encourages separation of said fluid into its gaseous and liquid phases, while minimizing fractioning of bubbles of gas and projection of drops of liquid towards the suction orifice of said internal pipe for gas discharge.

Preferably, in order to minimize the fractioning of gas bubbles, said outlet nozzle at the top end of said first internal pipe is also pointed to slope downwards at an angle that is substantially identical to the angle of the above-described helical gutter for discharging liquid.

In a preferred embodiment, said first and second internal pipes preferably present coaxial portions that are greater in diameter than their respective bottom portions. Specifically, said first internal pipe has an intermediate portion of larger diameter in its middle portion so as to contribute to slowing down the flow speed of the fluid within said first pipe, the coaxial second internal pipe likewise being subjected to the same diameter enlargement facing said first internal pipe so as to maintain an annular space between said first and second internal pipes that is substantially constant.

More particularly, the enclosure includes a helical gutter fastened in the proximity of and/or against the inside surface of said side wall of the enclosure and having its top end beneath the top opening of the first internal pipe and its bottom end terminating above said annular third orifice.

In an implementation, said helical gutter is fastened to said second internal pipe.

Said helical gutter serves to encourage liquid/gas separation by increasing the transit time of the partially degassed fluid in order to move down to the bottom end of the enclosure and in order to channel the discharge of said liquid separated from said gas at the outlet from said nozzle towards said peripheral annular third orifice. These characteristics, combined with using an outlet nozzle that flares as described above, also enables the speed of partially-degassed fluid particles flowing down inside said enclosure to be slowed down compared with the speed of crude fluid particles entering into said first internal pipe.

More particularly, in its top portion, the enclosure contains a device for filtering liquid droplets, preferably a coalescence device, on the path of the gas between the top opening of the first internal pipe and the top opening of the second internal pipe. In this way, this type of coalescence device is of the screen type (also known as a "demister" type) and it serves to filter liquid droplets that might be entrained by the gas.

More particularly, the enclosure includes pressure detection sensors and a liquid level sensor within the enclosure, preferably a level-monitoring device in the form of a radar or sonar type probe or a nuclear level sensor constituted by a ray-emitting strip and one or more measuring strips enabling the density profile of the fluid to be measured over the entire height of the enclosure. Such a sensor, is known to the person skilled in the art and serves in this example to verify that the liquid level rises above the bottom opening of said third orifice of the first internal pipe but does not go above the top opening of the second internal pipe for gas discharge, i.e. is far enough away from said top openings and said first and second internal pipes.

More particularly, the enclosure is made up of two enclosure portions that are fastened to each other and comprising:
a top wall portion having a domed, and preferably spherical, cap at its top end; and
a bottom wall portion including a said end wall.

This characteristic serves to facilitate maintenance of elements inside the enclosure, such as the coalescence device, the sensors, said first and second internal pipes, and the helical gutter, by providing access thereto by separating the two portions of the enclosure wall, and where appropriate, by raising to the surface only the top portion of the enclosure together with the equipment fastened thereto, for maintenance purposes.

More particularly, said support structure comprises a plurality of said connection pieces and of said enclosures that are connected thereto, there being preferably at least four of said connection pieces, which are preferably arranged symmetrically.

According to other particular features:
said enclosure is arranged vertically, being of cigar-like elongate shape of circular section with its top end in the form of part of a spherical cap; the shape of said enclosure gives it good resistance to hydrostatic pressure at the sea bottom, thus making it possible to use walls having a thickness of only 10 mm to 300 mm;
the length L1 of said enclosure is greater than or equal to 10 times its diameter D1, and preferably 15 to 30 times its diameter D1; more preferably, L1 lies in the range 5 m to 50 m and the diameter D1 lies in the range 0.5 m to 5 m; the dimensions for the diameter and the wall thickness optimize resistance to compression at great depth for the walls of said pressure-withstanding enclosure; and
the opening at the top end of said second internal pipe is situated at a height h of at least 1 m relative to the top opening of said first internal pipe.

The present invention also provides a unitary device for liquid/gas separation of respective liquid and gaseous phases of a fluid, suitable for use in a modular installation as defined above.

The present invention also provides a method of making a modular installation of the invention characterized in that the following successive steps are performed:
a) lowering a said unitary device suspended from a ship on the surface by a tie; and
b) preferably guiding its approach for docking with a said connection piece fastened on said support structure by using first guide elements secured to said enclosure and said second guide means secured to said support structure, said second guide elements co-operating with said first guide elements; and
c) connecting said enclosure to a said connection piece in disconnectable manner by using a fastener flange and coaxial sealing gaskets between said first, second, and third orifices passing through the end wall of the enclosure and said first, second, and third connection ducts respectively of said connection piece.

The present invention also provides a method of separating liquid and gaseous phases of crude oil by using a modular installation of the invention, characterized in that the following successive steps are performed:
1) sending crude oil by means of an arrival pipe to said first orifice of said end wall of the enclosure via and through said first duct of a said connection piece, at a reduced pressure P1 that is lower than the static pressure P2 at the sea bottom; and
2) the crude oil rising within said first internal pipe of the enclosure, then flowing through a top outlet of said first internal pipe as a flow tangential to the side wall of circular section of the enclosure, thereby causing it to be separated into a liquid phase and a gaseous phase; then 3) the liquid phase or partially degassed fluid moves back down towards said third orifice of the end wall at the bottom end of the enclosure, and preferably fills said enclosure up to a height level below the top opening of said first internal pipe, and being recovered via an external pipe for discharging liquid that is connected to said third outlet orifice of said connection piece; and 4) the gas separated from said oil is sucked into said second internal pipe towards said second orifice of the end wall at the bottom end of the enclosure, and is recovered via an external pipe for discharging gas that is connected to said second outlet orifice of said connection piece.

BRIEF DESCRIPTION OF THE DRAWINGS

Other characteristics and advantages of the present invention appear in the light of the following detailed description of embodiments given with reference to FIGS. 1 to 4, in which:

FIG. 2 is a longitudinal section view of a unitary gas-liquid separation device 1 of the present invention comprising said first internal pipe 2 for delivering phase fluid and said second internal pipe 3 for discharging gas arranged coaxially and connected at their bases to a connection piece 6;

FIG. 2A is a view showing the outlet and the top portion 2b of said first internal pipe coiled around and outside said second internal pipe; and FIG. 2B is a diagrammatic horizontal section view of FIG. 2A seen from above the fluid outlet nozzle 2c at the top end 2b of the first fluid delivery pipe 2; and FIG. 3 is a vertical axial section view of the three-channel coaxial connection piece 6 of the invention connected via annular gaskets 7-1, 7-2, 7-3 to the tubular bottom portion 1c-2 of the end wall 1c of the enclosure 1 of FIG. 2; and FIG. 4 is a perspective view of a multiphase fluid stream division device 12 having six top outlet orifices 12b1 to 12b6; and FIG. 4A shows a section view on a vertical axial midplane of the FIG. 4 division piece 12.

DETAILED DESCRIPTION OF THE PRESENTLY PREFERRED EMBODIMENTS

Figure 1:
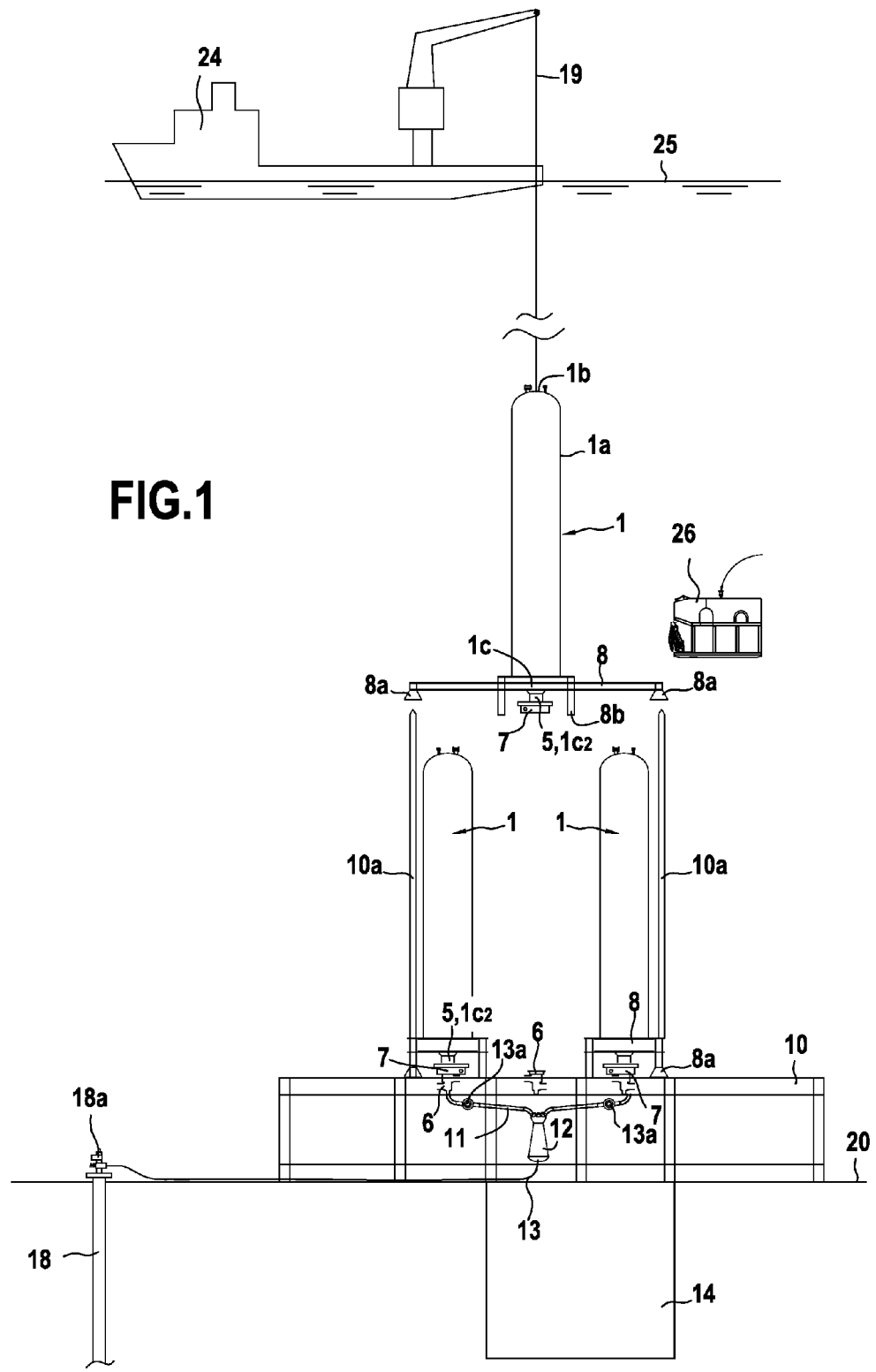
FIG. 1 is a view of a unitary separation device 1 being lowered in order to be docked and connected on a support structure 10 resting on the sea bottom and on which two unitary separation devices 1 are already connected, the various connection pieces 6 being connected to a stream division device 12 fed by a crude oil feed pipe 13 that is connected to a wellhead 18.

The main support structure 10 rests on the sea bottom 20, being fastened to a base resting on the sea bottom 20 or to a suction anchor 14 embedded in the sea bottom, this main support structure 10 being constituted by a frame made up of a trellis of beams.

The main support structure 10 is arranged in the proximity of an oil well 18 having a wellhead 18a connected by a crude oil arrival pipe 13 conveying crude oil from the well head to said support structure 10.

Said support structure 10 supports:
a plurality of vertical guide rods 10a forming said second guide elements; and
a plurality of three-channel coaxial connection pieces 6; and
at least one stream division device 12; and
valves for opening/closing said external pipes as follows:
a valve 11a controlling the arrival of multiphase fluid upstream from said connection piece 6, a valve 15b controlling the discharge of liquid into the external liquid-discharge pipe 15, and a valve 16b controlling the discharge of gas into the external gas-discharge pipe 16; and
an export pump 17 for discharging liquid via the external liquid-discharge pipe 15.

Advantageously, said main support structure 10 also supports portions of pipe that are connected to the ends of said external multiphase fluid arrival pipe 13, of said external degassed liquid-discharge pipe 15, and of said external gas-discharge pipe 16, or that are suitable for being connected thereto, said pipe portions being connected directly or indirectly to the lateral tubular orifices 6b1 and 6c1 and to the central bottom tubular orifice 6a1 of the connection piece 6 as described below.

The unitary separation device 1 as shown in the figures comprises an enclosure 1a with a wall having a main portion that is cylindrical of circular section surmounted by a domed end, such as for example a spherical cap, and terminated at its bottom end by an end wall 1c having a top portion in the form of a funnel 1c1 and a bottom portion 1c-2 that is cylindrical and of smaller diameter defining or being extended by a part forming said first, second, and third coaxial tubular orifices 5a, 5b, and 5c as described below.

The cylindrical wall of the enclosure 1a is fitted on the outside with a frame 8 supporting said first guide elements 8a defining orifices embodied at their bottom ends by funnel-shaped flared walls to make them easier to pass through by guide rods 10a of the main support structure 10 in order to guide the enclosure 1a while it is being lowered from the ship 24 at the surface 25 using a cable 19, and possibly using a remotely operated vehicle (ROV) 26 (a remotely operated undersea robot).

The frame 8 has legs 8b for mechanically stabilising the unitary device 1 resting on the main support structure 10 and/or for fastening it to the main support structure 10 after the connection piece 6 has docked and been connected, as described below. The complementary guide elements 8a and 10a may also be used for fastening the unitary device 1 after docking on the main support structure 10 and fastening the connection piece 6.

Said first guide elements 10a are positioned relative to the connection pieces 6 fastened on the support structure 10 in such a manner that when the enclosure 1 is lowered to be docked on the main support structure 10 by causing said first and second complementary guide means 8a and 10a to co-operate, the tubular bottom portion 1c-2 of the end wall 1c and/or the part containing said first, second, and third coaxial orifices 5a, 5b, and 5c, as described below, so that they become vertical and coincide with the top ends of the first, second, and third pipes 6a, 6b, and 6c respectively of the connection piece 6, as described below.

Figure 1A:
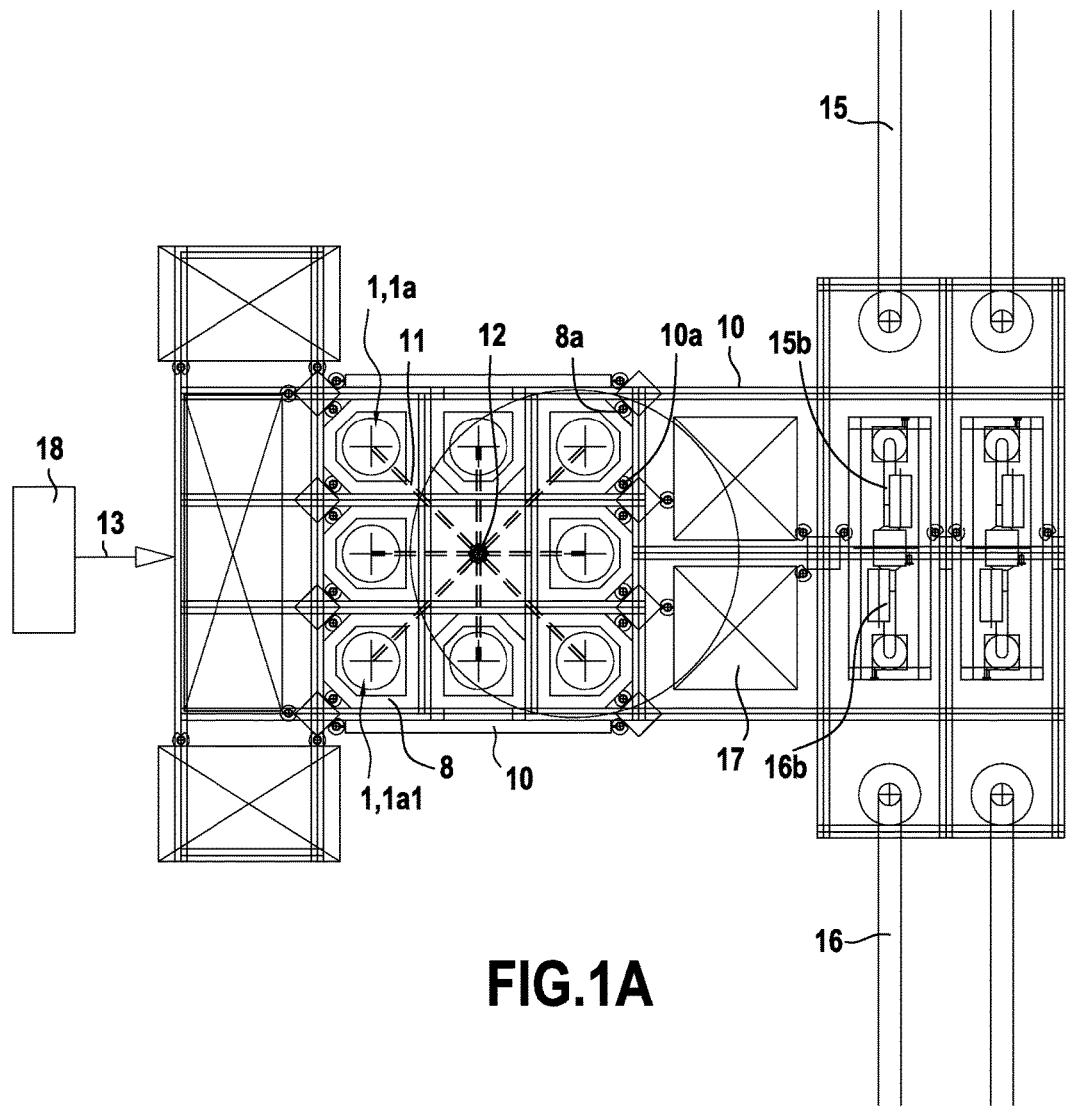
FIG. 1A is a plan view of a modular installation comprising a support structure 10 resting on the sea bottom and having eight unitary separation devices 1 connected thereto.

In FIG. 1A, there are shown eight enclosures 1a arranged vertically and in parallel, being arranged in a square with three enclosures per side, a stream division piece 12 being arranged on the central axis of the square, underneath it.

In FIG. 4, there can be seen a stream division piece 12 constituted by:
- a single bottom main tubular supply orifice 12a arranged vertically when it is fastened to the main support structure 10, its open bottom end 12a1 being connected to the end of an external multiphase fluid supply pipe 13; and
- a plurality of top secondary tubular outlet orifices 12b that slope, comprising six orifices 12b1 to 12b6 in this example, that are suitable for filling only six enclosures 1a, however there could be eight sloping secondary tubular outlet orifices 12b for supplying eight enclosures, as shown in FIG. 1A.

The open top ends of said secondary tubular outlet orifices 12b1 to 12b6 are connected respectively to a plurality of transfer pipe elements 11, which are connected at their other ends to the bottom ends of first central pipes 6a of the various connection pieces 6 of the various unitary fluid separation devices 1 fastened on the main support structure 10.

Figure 1B:
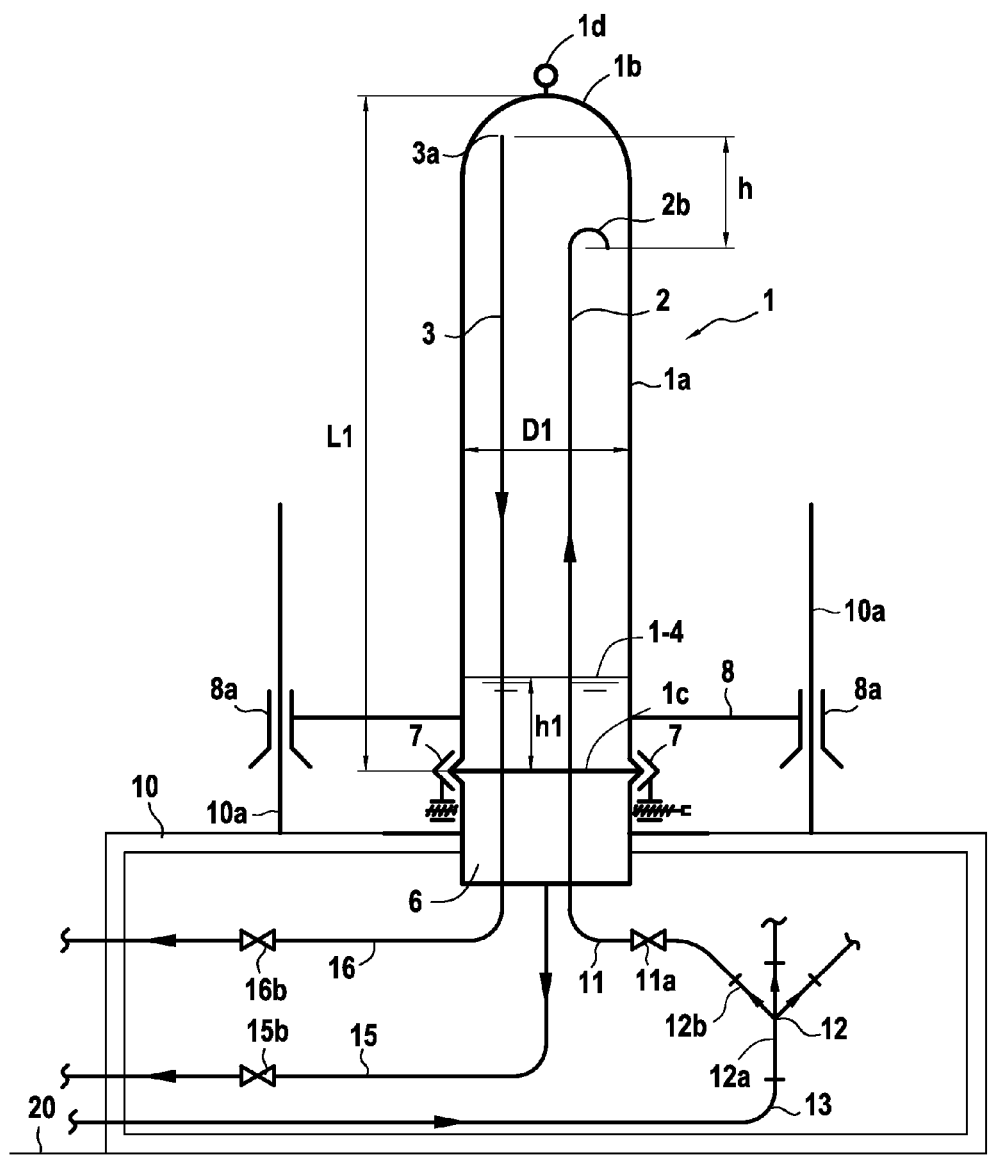
FIG. 1B is a diagrammatic view of an under-sea liquid-gas separation installation of the invention showing a single unitary separation device having said first internal pipe 2 for delivering multiphase fluid and said second internal pipe 3 for discharging gas, which pipes are shown diagrammatically side-by-side and not coaxially as in the invention in order to distinguish them more clearly and in order to show the different outlets firstly of the external pipe 13 for supplying multiphase fluid and secondly of the external pipe 15 for discharging liquid and of the external pipe for discharging gas 16, which pipes cooperate with respective valves 11a, 15b, and 16b.

In FIG. 1B, the pipe 13 is shown as having a bend so as to connect in the vertical axial direction with the bottom tubular supply orifice 12a of the stream division piece 12 shown in FIG. 4, with this being done to simplify the figure. Nevertheless, in reality, precautions are taken to avoid forming a bend in the external multiphase fluid supply pipe 13 that supplies the division piece 12.

Specifically, the stream division piece 12 is arranged at a height above the sea bottom 20 so that the end of the external multiphase fluid supply pipe 13 that is connected to the bottom end 12a1 of the piece 12 presents a radius of curvature that is sufficient to avoid fractioning the phases of the multiphase fluid it is carrying.

Likewise, said top secondary tubular outlet orifices 12b1 to 12b6 being inclined by an angle β=30° and also the transfer pipe elements 11 being of a length and of a shape possibly having two curves with a middle point of inflection contribute to being able to comply with radii of curvature in the transfer pipe elements 11, likewise serving to avoid fractioning the liquid and gaseous phases of the multiphase fluid.

The diameters of the various top secondary tubular outlet orifices 12b1 to 12b6 are less than the diameter of the bottom main orifice 12a, but the sum of the diameters of the various secondary orifices 12b is equal to the sum of the bottom main orifice 12a, such that the inlet and outlet flow speeds into and from the distributor are all identical.

In FIG. 2, there can be seen the unitary separation device of the present invention having an enclosure with a wall 1a that is made up of two portions, namely:
- a top portion 1a-1 constituted by the cylindrical main portion of circular section surmounted by a spherical cap 1b; and
- a bottom portion 1a-2 having its top face forming a flange for fastening by means of bolts 1a-3 with the bottom face of the top portion 1a-1, which portions are fastened together using bolts 1a-3.

The bottom portion 1a-2 of the wall of the enclosure defines an end wall 1c at its bottom end that is in the form of a funnel 1c-1 that is extended at its bottom end by a cylindrical portion 1c-2 of diameter D2 that is small relative to the diameter D1 of the cylindrical portion of the enclosure 1a, where, by way of example, D2 is less than ¼ of D1, and where, by way of example, D1 lies in the range 0.5 m to 3 m for a length L1 of the enclosure lying in the range 5 m to 30 m.

The cylindrical wall 1c-2 defines an annular orifice for discharging the liquid contained inside said enclosure, referred to as the annular third orifice 5c.

A first internal pipe 2 has its main portion arranged vertically and axially along the axis ZZ' at the center of said enclosure, with the exception of a bend 2b at its top portion, as described below. Its bottom end is terminated by or extended by a central first orifice 5a passing coaxially through the cylindrical bottom portion 1c-2 of the end wall.

About halfway up the enclosure, the first internal pipe 2 has a flare 2a' followed by a larger-diameter section 2' of the first pipe that terminates at its top end by turning back as a loop having multiple curves to form a swan neck 2b such that the outlet nozzle 2c at the open top end 2a of the first internal pipe 2 comes into the proximity of and is parallel to the inside surface of the cylindrical wall 1a, as described below. The nozzle 2c presents a flared side wall such that its opening 2a is larger than the diameter at the end of the loop of the top portion 2b of the first internal pipe to which said nozzle 2c is fitted.

The function of the flare 2a' and of the larger section 2' of the first pipe relative to the bottom portion 2" of the smaller diameter internal pipe is to reduce the speed of the multiphase fluid inside the first internal pipe. The flare of the side wall of the nozzle 2c also has the effect of reducing the speed of the fluid at the outlet from the pipe 2.

FIGS. 2A and 2B show the curved profile in horizontal section of the top portion 2b and of the nozzle 2c at the end of the top portion 2b of the bend portion of the first internal pipe 2 on the outside and around the axial top portion 3b of the second pipe 3 terminating via the opening 3a.

This curved profile parallel to the profile of the cylindrical wall 1a of the enclosure, combined with an outlet of vertical rectilinear shape at the top opening 2a of flat section at the end of the nozzle 2c has the effect of producing a flow of fluid at the outlet from the first pipe 2 in the form of a sheet that is tangential to the inside wall of the cylindrical wall 1a of the enclosure, thereby minimizing the destructuring of the multiphase fluid so as to avoid fractioning gas bubbles, which would impede separation, and also so as to avoid projecting drops of liquid that might be entrained into the gas outlet opening. Thus, the multiphase fluid is pressed against the cylindrical inside wall of the enclosure on leaving the nozzle 2c by the centrifugal forces that result from the swirling flow against the cylindrical wall of the enclosure.

Thereafter, the liquid portion of the multiphase fluid moves down under gravity through the intermediate portion 1-2 of the enclosure into the bottom portion 1-3 that becomes filled with liquid up to a certain height hl, before and/or while flowing through the annular third orifice 5c for liquid discharge.

On leaving the nozzle 2c, the gaseous portion of the multiphase fluid, which is lighter, rises towards the top portion 1-1 of the enclosure, so as to be discharged via the top end 3a of a second internal pipe 3 for discharging gas, as described below.

In order to discharge the liquid, in a preferred embodiment as shown in FIG. 2, the enclosure has a helical gutter 4 fastened against the inside surface of the cylindrical wall of the enclosure 1a having its top end 4a just below the outlet from the nozzle 2c and having its bottom end 4b just above the funnel-shaped bottom portion 1c-1 of the bottom wall of the enclosure.

The helical pitch of the helical gutter 4 is such that it slopes at an angle α relative to the horizontal that is substantially identical to the downward slope angle of the flow direction YY' of the fluid leaving the opening 2a of the nozzle 2c.

A second internal pipe 3 for discharging the gas extends vertically and axially at the center of the enclosure 1a, being arranged in its bottom portion coaxially around the larger diameter middle portion 2' and the smaller diameter bottom portion 2" of the first internal pipe 2. The second internal pipe 3 thus has a larger diameter middle portion 3' so as to follow the enlargement of the middle portion 2' of the first pipe 2, in order to ensure that the width of the annular space between the first internal pipe 2 and the second internal pipe 3 remains substantially identical.

The bottom end of the second internal pipe 3 defines or is extended by a second tubular orifice referred to as the annular second orifice 5b for gas discharge that is arranged coaxially and around the central first orifice 5a at the bottom end of said second internal pipe 2.

Said annular third orifice 5c at the bottom end of the cylindrical bottom portion 1c-2 of the end wall 1c defines an annular space around the second internal pipe 3, which space serves for discharging liquid from the bottom portion 1-3 of the enclosure.

The top end 3a of the second internal pipe 3 comes into the proximity of the cover of the enclosure constituted by the spherical cap 1b at a height h lying in the range 1 m to 2 m above the opening 2a of the nozzle 2c at the top end of the first internal pipe 2.

In the top portion 1-1 of the inside of the enclosure on the gas path, between the top opening 2a of the first internal pipe 2 and the top opening 3a of the second internal pipe 3, there is arranged a coalescence device 9 for coalescing droplets of liquid entrained by the gas, which device acts in combination with the top position of the opening of the 3a of the second internal pipe 3, to make it possible to avoid fine droplets of liquid being entrained together with the gaseous phase discharged by the second internal pipe 3.

It is possible to clean this coalescence device 9 because it is possible to disconnect the two portions 1a-1 and 1a-2 of the enclosure once it has been raised to the surface for maintenance together with the equipment that is secured thereto.

Said enclosure also has pressure sensors 20-21 and a liquid level sensor 22 passing therethrough. More particularly, it is possible to use nuclear level sensors, each constituted by a radiation-emitting strip and one or more measurement strips arranged vertically within the enclosure and having the known function of determining the density profile of fluids over the full height of the enclosure in order to be able to deduce therefrom the level of the gas-liquid interface 1-4 within the enclosure. These strips are housed in leaktight sheaths that withstand pressure and that pass through the top of the enclosure. Leaktight stoppers 22a that are operable by an ROV 26 close the sheath tubes of said detector strips, and they can also be opened at the surface in order to recover said detector strips for maintenance. In another embodiment, the sheaths of the various sensor strips 21, 22 pass through the end wall 1c of the enclosure and they are not connected to the top portion of the enclosure, such that the detector strips are then recovered by disconnecting and recovering the entire enclosure 1.

The separation enclosure 1 has hoist attachment points, preferably in its top portion, e.g. in the form of hoist lugs 1d incorporated in the wall of the enclosure or recesses or projections formed in/on the wall of the enclosure in order to provide bearing surfaces for a hoist clamp that is placed over the top portion of the wall of the enclosure. It is also possible to place the leaktight enclosure in a metal framework that carries the hoist attachment points.

In FIG. 3, there can be seen the bottom portion 1c-2 of the end wall, which terminates in an intermediate part 5 welded to the bottom end of the cylindrical bottom portion 1c-2 of the end wall 1c. This bottom end part 5 of the cylindrical portion 1c-2 forms and defines a tubular central first orifice 5a for supplying fluid to the first internal pipe 2, a coaxial annular second orifice 5b defining an annular space around the tubular first orifice 5a extending the bottom end of the second internal pipe 3, through which annular space 5b the gas coming from the top end 3a of the second internal pipe 3 is discharged to outside the enclosure 1, and an annular third orifice 5c that is likewise coaxial and that defines an annular space around the annular second orifice 5b, said annular third orifice 5c being defined by the outside wall of the part 5 or of the bottom portion of the cylindrical portion 1c-2.

The bottom end of this bottom part 5 forms a fastener flange 5-1 suitable for being reversibly fastened by fastener clamps 7 (not shown in FIG. 3) to the top end 6-1 of the connection part 6. Coaxial metal gaskets 7-1, 7-2, and 7-3 are interposed between the bottom end 5-1 of the part 5 and the top end 6-1 of the connection part 6.

The connection part 6 is made up of three portions 6-1, 6-2, and 6b-2 that are welded to one another. An internal portion 6-2 of the part 6 has a central first duct 6a arranged axially and vertically. After the part 6 has been connected by the fastener clamps 7 to the bottom end of the part 5, this central first duct 6a extends and is in continuity with said tubular first orifice 5a.

The bottom end 6a-1 of the central first duct 6a of the connection part 6 is connected to the end of a transfer pipe element 11 or directly to the end of an external pipe 13 for supplying multiphase fluid.

Around the central first duct 6a, the internal part 6-2 of the connection part 6 forms an annular second duct 6b that is coaxial about the first duct 6a, with its top end communicating with the annular second orifice 5b of the part 5 for discharging gas. The annular second duct 6b is closed at its bottom end 6b-2 and has a first lateral orifice for discharging gas on an axis XIX' perpendicular to the axis ZZ' of the connection part 6, suitable for connection to the end of an external pipe 16 for discharging gas.

Around the annular second duct 6b, the external portion 6-1 of the connection part 6 co-operates with the internal part 6-2 to define an annular third duct 6c for discharging liquid, having its top end communicating with the annular third orifice 5c of the part 5 in order to enable liquid to be discharged. The liquid-discharge third duct 6c of the connection part 6 is closed at its bottom end 6c-2 and includes a second lateral orifice 6c-1 for discharging liquid, of axis $X_2X_2'$ perpendicular to the axis ZZ', and connected to the end of an external pipe 15 for discharging liquid.

The end walls of the annular spaces 6b and 6c may be of helical shape 6d in order to collect any solid particles of sand that might be conveyed together with the liquid portion of the multiphase fluid and force them to flow so as to avoid any accumulation of solid particles (sand . . . ) that might clog the pipes.

Crude oil reaches the well head 18a at high pressure, e.g. in the range 100 bars to 200 bars. The wellhead 18a may be fitted with a pressure-reducer device and with an automatic valve for controlling flow rate that is controlled from the surface and that is connected to the external pipe 13 for supplying oil that arrives at the flux division piece 12 at reduced pressure, e.g. 20 bars. The fluid is slowed down upstream from the separator in order to avoid flows that are too violent at the inlet to the enclosure, and thus avoid disturbing separation.

Crude oil penetrates into the enclosure via the first internal pipe 2 from which it pours out via the top end 2a of the first pipe and separates into its liquid and gaseous phases. The drop in pressure takes place at the wellhead, while inside the separation station, pressure is more or less constant. The liquid portion fills the bottom end of the enclosure up to a level 1-4 at a height that is monitored by the level sensors 21-22 and controlled by the export pump 17 for discharging liquid via the external pipe 15.

The open top end 3a of the second internal pipe 3 is arranged at a sufficient height h lying in the range 1 m to 2 m above the end of the 2a opening of the second pipe 2 to ensure that projections of plugs of oil or of liquid portions of oil as can be caused by the sudden arrival of large pockets of gas at the outlet 2a of the pipe 2, do not reach the top end 3a of the second pipe 3.

The degassed liquid oil, as recovered in the low portion of the enclosure and as directed via the outlet orifice 6-1 of the connection part 6 to the external pipe 15 for discharging liquid may be sent to a floating support on the surface or to a secondary water/oil separator on the sea bottom so that only the oil is sent to the surface, with the water either being reinjected into a well similar to the well 18, or merely being released into the sea, providing it is acceptably clean, i.e. providing it has a sufficiently small quantity of residual particles of crude oil. The discharge of liquid can be controlled by using an export pump 17.

Likewise, the gas discharged by the external pipe 16 for gas discharge may be sent to the surface or it may be re-compressed at the sea bottom and then reinjected into a well similar to the well 18.

More particularly, said crude oil is sent to the bottom end of said first internal pipe, preferably in such a manner that the pressure difference $\Delta P = P1 - P0$, where P0 is the pressure at which the gas line reaches the FPSO on the surface, is greater than the head losses in the external pipe for discharging gas from said first lateral orifice to the surface. This makes it possible to cause the gas to rise to the surface without additional equipment and/or without supplying additional external energy, and in particular without using a compressor.

Preferably, the rate at which crude oil arrives is controlled upstream from said connection piece by a flow rate control valve and/or the rate at which the degassed fluid is discharged downstream from said connection piece 6 is controlled by a flow rate control valve and/or by the speed of said export pump 17, as a function of measurements made by at least one said device for monitoring the level of the fluid within said enclosure, in such a manner that the level of the liquid in the bottom of the enclosure remains far enough away from the inlets/outlets of the separator.

More particularly, said support structure is installed at the sea bottom, at a depth lying in the range 100 m to 4000 m, and a pressure P1 is established within said enclosure, the pressure P1 lying in the range 10 bars to 50 bars ($10 \times 10^5$ Pa to $50 \times 10^5$ Pa), and preferably being equal to 20 bars ($20 \times 10^5$ Pa).

Preferably, said enclosure is thermally insulated. This embodiment makes it possible to keep the crude oil fluid at the high temperature in the range 40° C. to 100° C., or higher, at which it leaves the well head, thereby making it easier to raise the fluid to the surface, avoiding the solidification of paraffins or the formation of gas hydrates by the crude oil cooling to below 30° C.-35° C., which might lead to plugs and blockages being created within the internal pipe 2. In the event of a production being stopped, the thermal insulation of the enclosure thus makes it possible to keep the temperature inside the enclosure for as long as possible above the critical temperature at which gas hydrates form, thereby leaving the operator time to perform the preservation operations that are necessary for mitigating this risk.

Give the possibility of placing additional unitary separation devices 1 on the main support structure 10 resting on the seabed and of connecting them thereto from a ship 24 on the surface 25, enables the capacity for separating crude oil on the seabed to be adapted over time and also, advantageously, makes it possible to perform maintenance on the surface by disconnecting and raising unitary separation devices 1 from a ship 24 on the surface 25.

The possibility of using enclosures of relatively smaller sizes given their greater number, the handling of the enclosures 1a from the surface can be performed by vessels of standard size as used for providing offshore oil installations with assistance and maintenance, without it being necessary to have recourse to excessive hoisting capacity.

An essential advantageous characteristic of the invention, which consists in arranging the fluid delivery inlet and the outlets for the gaseous phase and for the liquid phase coaxially at the bottom end of the enclosure 1a via a three-channel coaxial connection piece 6, facilitates installing and connecting unitary separation devices 1 on the main support structure 10 at the sea bottom, and also facilitate maintenance of the unitary devices 1, as explained above.

Specifically, the coaxial arrangement of the various internal pipes for delivering fluid and for separately discharging the gaseous and liquid phases enables the sealing gaskets 7-1, 7-2, and 7-3, specifically metal gaskets, between the bottom ends of the orifices 5a, 5b, and 5c of the end wall 1c of the enclosure 1 and the various ducts 6a, 6b, and 6c of the connection piece 6 at its top end, to remain in pressure equilibrium for the two internal gaskets 7-1 and 7-2, thus avoiding damaging the gaskets in the event of the enclosure being pressurized or depressurized during the various above-explained disconnection or maintenance operations.

The invention claimed is:

1. A unitary device for liquid/gas separation of respective liquid and gaseous phases of a fluid, wherein said unitary device for liquid/gas separation comprises a single enclosure comprising a leaktight wall that withstands pressure at the sea bottom and the internal pressure of said fluid, the leaktight wall being arranged about a vertical axis of revolution, and said enclosure containing:

1) a first internal pipe for delivering the multiphase fluid, the first internal pipe rising within said enclosure from a bottom end of said first internal pipe that includes or co-operates with a first orifice passing through a wall portion referred to as the end wall of the enclosure up to an open top end opening out into the top portion of the end wall of the enclosure, and continuing up to an open top end of said first internal pipe, and opening out into a top portion of the enclosure; and 2) a gas-discharge second internal pipe extending within said enclosure from an open top end to a bottom end of said second internal pipe that includes or co-operates with a second orifice passing through the end wall of the enclosure; and 3) a third orifice passing through said end wall of the enclosure coaxially around said first and second orifices in the end wall of the enclosure.

2. A modular undersea installation for liquid/gas separation of respective liquid and gaseous phases of a fluid, in particular the liquid and gaseous phases of a crude oil, the installation comprising:
   a) a main support structure resting on and/or anchored to the sea bottom and having a plurality of unitary devices for liquid/gas separation connected thereto or suitable for being connected thereto in reversible manner; and
   b) at least one said unitary device for liquid/gas separation as defined in claim 1 fastened on said main support structure,
   and
   c) a plurality of three-channel connection pieces fastened to said support structure, with at least one said connection piece being connected to a said enclosure, each said connection piece comprising:
      c1) a first connection duct having a top end connected to a said first orifice of the end wall of said enclosure, or suitable for being connected thereto, said first connection duct having a first outlet orifice connected to an external pipe for supplying said multiphase fluid at the sea bottom or to a pipe element connected to the end of an external pipe for supplying said multiphase fluid at the sea bottom, or suitable for being connected thereto; and
      c2) a second connection duct having a top end connected to a said second orifice of the end wall of said enclosure, or suitable for being connected thereto, said second connection duct having a second outlet orifice connected to an external pipe for discharging gas, or suitable for being connected thereto; and
      c3) a third connection duct arranged around said first and second connection ducts at its top end connected to a said third orifice of the end wall of said enclosure, or suitable for being connected thereto, said third connection duct having a third outlet orifice connected to an external pipe for discharging liquid, or suitable for being connected thereto.

3. The modular installation according to claim 2, wherein said second orifice of the end wall of the enclosure is an annular second orifice arranged coaxially around said tubular first orifice of the end wall of the enclosure, and said third orifice of the end wall of the enclosure is an annular third orifice arranged coaxially around said first and second orifices of the end wall of the enclosure, and said three-channel connection piece is a connection piece having three coaxial channels and arranged vertically on said support structure and comprising:
   c1) a first connection duct arranged vertically and from which said first outlet orifice is constituted by the axial bottom end of said first connection duct; and
   c2) a second connection duct, arranged coaxially around said first duct at its top end, and connected vertically to an annular said second orifice of said end wall of the enclosure, or suitable for being connected vertically thereto, and including a said second outlet orifice constituting a lateral orifice; and
   c3) a third connection duct arranged coaxially around said first and second connection ducts at its top end, and connected vertically to an annular said third orifice of the end wall of the enclosure, or suitable for being connected vertically thereto, and including a said third outlet orifice constituting a lateral orifice.

4. The modular installation according to claim 3, wherein said support structure resting on the sea bottom supports at least one device for dividing and distributing the multiphase fluid and presenting a single main tubular axial supply orifice that is arranged vertically, having its open bottom end connected to the end of an external pipe for supplying said multiphase fluid at the bottom of the sea, or suitable for being connected thereto, and having its open axial top end communicating with a plurality of secondary tubular outlet orifices that are inclined relative to said axial direction, that are of the same diameter, and that are inclined at the same angle and that are arranged symmetrically and regularly relative to and around said axial direction, said secondary tubular outlet orifices being connected to a plurality of pipe elements for transferring supply fluid, or being suitable for being connected thereto, which pipe elements are connected respectively to a plurality of said first ducts of said connection pieces, or are suitable for being connected thereto, which connection pieces are connected to the bottom ends of a plurality of said enclosures, or are suitable for being connected thereto.

5. The modular installation according to claim 4, wherein said connection pieces and said enclosures are arranged relative to said division in such a manner that head losses between said division device and said enclosures are substantially identical to one another, said connection pieces and said enclosures being arranged symmetrically relative to said division device above and around said division device.

6. The modular installation according to claim 2, wherein said enclosure is secured to first guide elements of male or female type, arranged at the outside of said enclosure, and said support structure includes second guide elements of female or of male type, respectively, co-operating with said first complementary guide elements, or suitable for co-operating therewith, to enable a said unitary device to dock vertically facing a said connection piece.

7. The modular installation according to claim 2, wherein said enclosure has a cylindrical side wall of circular section, having its top end closed by a domed and spherical cap and having an end wall at its bottom end that is in the form of a funnel that tapers downwards to form a vertical tubular bottom wall defining said annular third orifice for discharging liquid.

8. The modular installation according to claim 2, wherein said first internal pipe for delivering multiphase fluid extends vertically, preferably substantially on the axis of said enclosure, inside said second internal pipe beneath a top portion of said first internal pipe, which top portion of said first internal pipe loops back outside said second internal pipe, terminating in a fluid outlet nozzle having a flared wall defining a said top opening of said first internal pipe, such that said top opening of the first pipe opens out in the proximity of the side wall of the enclosure so that the fluid flows out therefrom parallel to said cylindrical side wall in a direction that slopes downwardly, and said second internal pipe for discharging gas extends axially coaxially relative to said first internal pipe beneath said top portion thereof, said first and second internal pipes presenting coaxial portions that are greater in diameter than their respective bottom portions.

9. The modular installation according to claim 2, wherein the enclosure includes a helical gutter fastened in the proximity of and/or against the inside surface of said side wall of the enclosure and having a top end beneath the top opening of the first internal pipe and a bottom end terminating above said annular third orifice.

10. The modular installation according to claim 2, wherein the enclosure contains a device for filtering liquid droplets, on the path of the gas between the top opening of the first internal pipe and the top opening of the second internal pipe.

11. The modular installation according to claim 2, further comprising pressure detection sensors and a liquid level sensor within the enclosure.

12. The modular installation according to claim 2, wherein the enclosure is made up of two enclosure portions that are fastened to each other and comprising:
   a top wall portion having a domed, and preferably spherical, cap at its top end; and
   a bottom wall portion including a said end wall.

13. The modular installation according to claim 2, wherein said support structure comprises a plurality of said connection pieces and of said enclosures that are connected thereto, there being at least four of said connection pieces, which are arranged symmetrically.

14. A method of making a modular installation according to claim 2, wherein the following successive steps are performed:
   a) lowering a said unitary device suspended from a ship on the surface by a tie; and
   b) guiding its approach for docking with a said connection piece fastened on said support structure by using first guide elements secured to said enclosure and said second guide means secured to said support structure, said second guide elements co-operating with said first guide elements; and
   c) connecting said enclosure to a said connection piece in disconnectable manner by using a fastener flange and coaxial sealing gaskets between said first, second, and third orifices passing through the end wall of the enclosure and said first, second, and third connection ducts respectively of said connection piece.

15. A method of separating liquid and gaseous phases of crude oil by using an installation according to claim 2, wherein the following successive steps are performed:
   1) sending crude oil by means of an arrival pipe to said first orifice of said end wall of the enclosure via and through said first duct of a said connection piece, at a reduced pressure P1 that is lower than the static pressure P2 at the sea bottom; and
   2) the crude oil rising within said first internal pipe of the enclosure, then flowing through a top outlet of said first internal pipe as a flow tangential to the side wall of circular section of the enclosure, thereby causing it to be separated into a liquid phase and a gaseous phase; then
   3) a liquid phase or partially degassed fluid moves back down towards said third orifice of the end wall at the bottom end of the enclosure, and preferably fills said enclosure up to a height level below the top opening of said first internal pipe, and being recovered via an external pipe for discharging liquid that is connected to said third outlet orifice of said connection piece; and
   4) the gas separated from said oil is sucked into said second internal pipe towards said second orifice of the end wall at the bottom end of the enclosure, and is recovered via an external pipe for discharging gas that is connected to said second outlet orifice of said connection piece.

* * * * *